United States Patent [19]

Stephany

[11] Patent Number: 4,716,432
[45] Date of Patent: Dec. 29, 1987

[54] EXPOSURE CONTROL APPARATUS

[75] Inventor: Thomas M. Stephany, Churchville, N.Y.

[73] Assignee: Eastman Kodak Company, Rochester, N.Y.

[21] Appl. No.: 855,289

[22] Filed: Apr. 24, 1986

[51] Int. Cl.[4] ............................ G03B 9/08; G03B 9/14
[52] U.S. Cl. .................................. 354/446; 354/234.1; 354/271.1
[58] Field of Search ............... 354/435, 436, 439, 440, 354/446, 449, 450, 451, 452, 453, 234.1, 271.1

[56] References Cited

U.S. PATENT DOCUMENTS

| | | | |
|---|---|---|---|
| 2,316,975 | 4/1943 | Ruge | 33/143 |
| 2,321,322 | 6/1943 | Ruge | 201/48 |
| 2,681,566 | 6/1954 | Ruge | 73/141 |
| 3,184,962 | 5/1965 | Gay | 73/88.5 |
| 3,526,176 | 9/1970 | Hackenberg et al. | 95/10 |
| 3,563,153 | 2/1971 | Watanabe | 95/64 |
| 3,812,501 | 5/1974 | Mielke | 354/451 |
| 3,887,929 | 6/1975 | Imura | 354/46 |
| 3,982,257 | 9/1976 | Togashi | 354/286 |
| 4,325,614 | 4/1982 | Grimes | 354/23 D |
| 4,333,722 | 6/1982 | Lee | 354/234 |
| 4,408,858 | 10/1983 | Lee | 354/271.1 |
| 4,413,895 | 11/1983 | Lee | 354/234.1 |
| 4,558,937 | 12/1985 | Petersen et al. | 354/234.1 |

FOREIGN PATENT DOCUMENTS 0172629  9/1984  Japan .................. 354/453

*Primary Examiner*—Russell E. Adams
*Attorney, Agent, or Firm*—Donald D. Schaper

[57] ABSTRACT

Exposure control apparatus is disclosed for controlling the amount of light admitted to a photosensitive surface. The apparatus comprises an electromagnetic actuator having a pair of aperture blades which are biased toward a rest position and are movable away from the rest position to define an aperture; the aperture blades also function as a shutter. A control means regulates current supplied to the actuator to control aperture size and exposure time. In order to precisely control the exposure interval, the control means includes a means for continuously sensing the position of at least one of the aperture blades.

7 Claims, 6 Drawing Figures

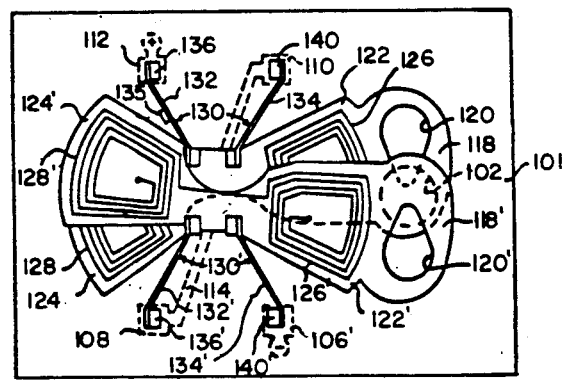
FIG. 2
FIG. 3
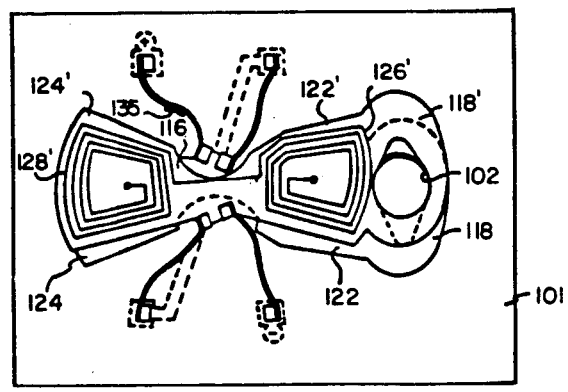

EXPOSURE CONTROL APPARATUS

FIELD OF THE INVENTION

The present invention relates to exposure control apparatus for a camera. More particularly, the invention relates to such apparatus in which the performance of the apparatus is monitored during an exposure interval to precisely regulate the amount of light admitted to a photosensitive surface.

DESCRIPTION OF THE PRIOR ART

Automatic exposure control devices for cameras are known in which a pair of aperture blades define the aperture size and also function as a shutter. The blades have grooves or cut-out portions which are configured to form a range of progressively increasing aperture sizes as they are moved from an initial position toward a fully open position. The blades can be controlled by an actuator driven by an electrical circuit which is responsive both to automatically provided inputs, such as the level of scene or image brightness, and to manual inputs provided by the operator to control the aperture size or shutter speed. One problem with such devices is that a given output from an actuator, such as an electromagnetic actuator, does not necessarily always produce the same movement of the aperture blades. Thus, it has been recognized that it is desirable to monitor the actual blade displacement during the course of an exposure interval.

In U.S. Pat. No. 4,325,614, there is disclosed an automatic exposure control in which an aperture blade is driven by a stepper motor which drives the blades in accordance with inputs including the lever of scene brightness. The exposure control further includes a feedback system for monitoring blade displacement during the course of an exposure interval and for providing an electrical output which is representative of such displacement. The feedback system includes an optical encoder having a plurality of vertical slits on the blade which function in conjunction with a pair of light emitting diodes to produce a digitally-encoded output. One problem with such a device is that the optical encoder is relatively complex and requires modification of the aperture blade. Further, the encoder does not produce a continuous signal, since a signal is only produced when the blade reaches a particular position in which the slots are lined up with the diodes. Thus, while the feedback system indicates whether the blade is moving, it does not give a continuous signal of the precise blade position.

SUMMARY OF THE INVENTION

It is an object of the present invention to provide an improved exposure control apparatus in which the position of an aperture blade is continuously monitored during an exposure interval.

In accordance with one aspect of the invention, there is provided exposure control apparatus for regulating the amount of light admitted to a selected area, the apparatus comprising: light limiting means movable from a rest position to admit light to the area: means for moving the light limiting means; means for urging the light limiting means toward the rest position; means for providing a first output indicative of ambient light; means for sensing a change in the urging means which is indicative of an instantaneous position of the light limiting means and for producing a second output proportional to the change; and means for actuating the moving means to admit a predetermined amount of light to the area in response to said first and second outputs.

The present invention provides a means for monitoring the position of an aperture blade without changing the structure of the blade and without making major modifications to the exposure control apparatus. A further advantage of the present invention is that it provides a continuous signal which is indicative of the instantaneous position of the blade at all times during the exposure interval.

Other features and advantages will become apparent from reference to the following description of the preferred embodiment when read in light of the attached drawings.

BRIEF DESCRIPTION OF THE DRAWINGS

FIG. 2 is a plan view of the actuator of FIG. 1, with the magnets removed, showing the aperture blades in an initial position;

FIG. 3 is a plan view similar to FIG. 2, but with the aperture blades in an open position;

DESCRIPTION OF THE PREFERRED EMBODIMENT

Figure 1:
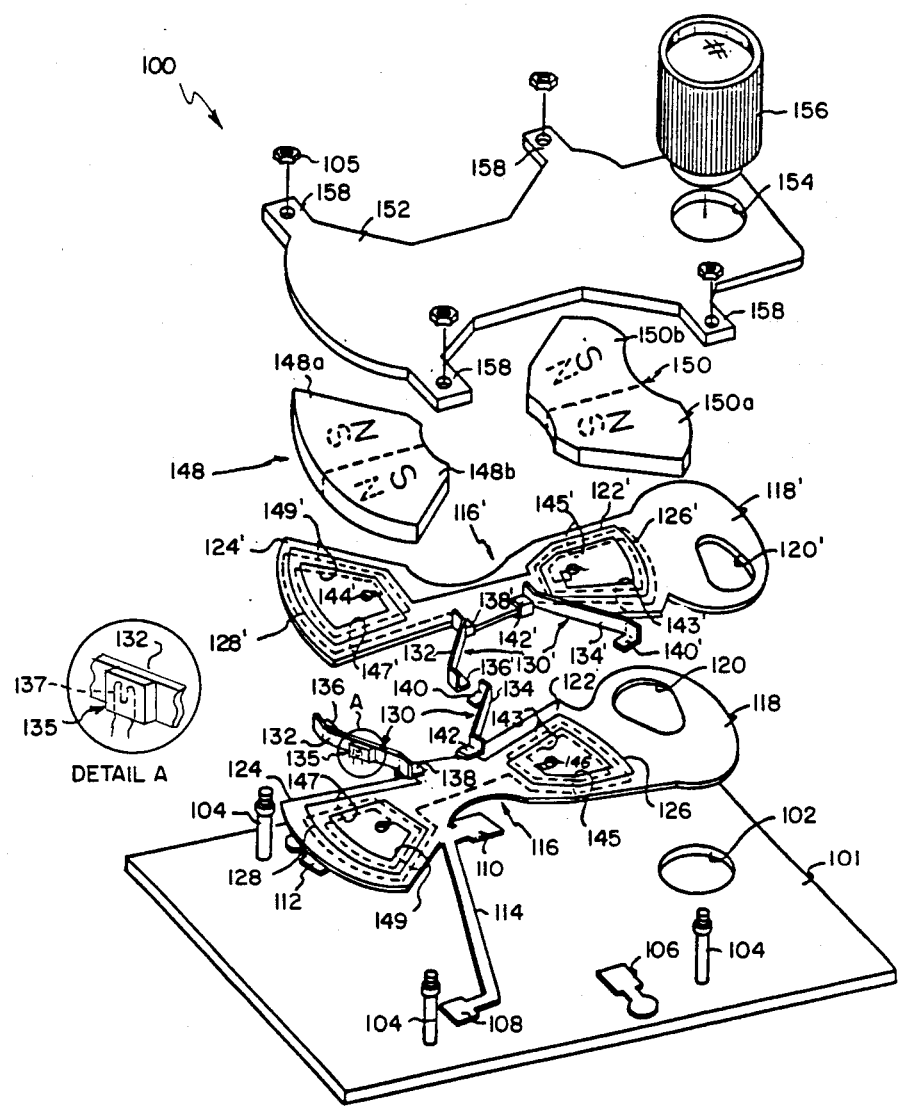
FIG. 1 is an exploded perspective view of the electromagnetic actuator in the exposure control apparatus of the present invention.
Figure 4:
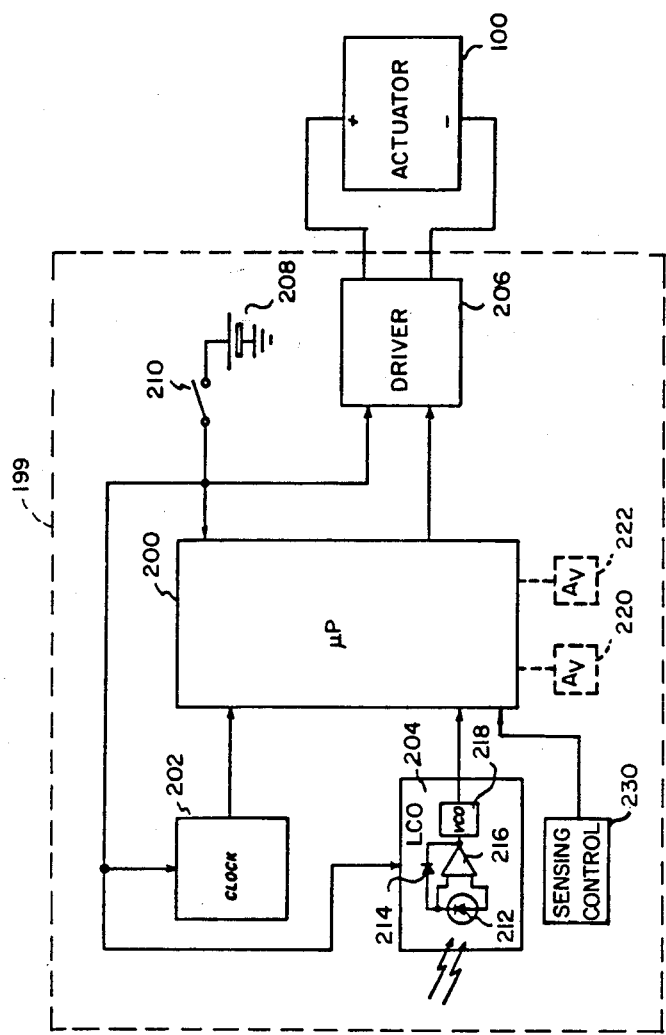
FIG. 4 is a schematic diagram of the control means in the exposure control apparatus.

The exposure control apparatus of the present invention includes an electromagnetic actuator 100, shown in FIG. 1, and a control means 199, shown in FIG. 4. Actuator 100 includes a mechanism plate 101 which has a fixed aperture 102 adapted to overlie a photosensitive surface (not shown). Mechanism plate 101 is made from mild steel and is covered with a layer of dielectric material, such as a porcelain enamel. Four spacer posts 104 are supported on plate 101, and four conductive mounting pads 106, 108, 110 and 112 are formed on the enamel surface of plate 101. Conductive mounting pads 106 and 112 are adapted to be connected to electrical contacts of a power source, and pads 108 and 110 are electrically connected by a conductor strip 114.

An armature 116 includes an aperture blade 118 having a tapered aperture 120 therein, and two coil support portions 122 and 124. Spiral coils 126 and 128 are formed on the coil support portions 122 and 124 respectively. As will be apparent from the discussion which follows, blade 118 is movable relative to aperture 102 to function as a light limiting means which regulates the amount of light passing through aperture 102.

Armature 116 is supported for pivotal movement by a flexure hinge 130 comprising a pair of leaf springs 132 and 134 formed from two mil beryllium sheet. Flexure hinge 130 defines a virtual pivot at a point where a projection of the springs 132, 134, would intersect, and thus, hinge 130 serves as a pivotal support as well as a means for urging blade 116 toward a rest position. Spring 132 has a tab 138 soldered to an end of the coil 128. Similarly spring 134 has a tab 142 attached to coil 126.

A strain transducer 135 is mounted on spring 132 to provide a means for sensing a change in spring 132 and thereby monitor the position of aperture blade 118. Transducer 135 contains a wire 137 which deforms in exactly the same manner and to the same degree as spring 132 when stress is applied to the spring 132. The deformation, or strain, in the wire 137 is directly proportional to the resistance of the wire. As will be explained in detail hereinafter, this change in resistance is used to produce a signal indicative of the instantaneous position of blade 118. One example of a strain transducer suitable for use in the present invention is a strain gage, part number FAE-12S-12SGL, manufactured by BLH Electronics, 42 Fourth Ave., Waltham, Mass.

Coil 128 includes windings on both sides of blade 118 which are connected through a hole 144 in blade 118, as shown in FIG. 1. In a similar manner, coil 126, which is connected to coil 128, includes windings on both sides of blade 118 which are connected through a hole 146 in blade 118. As viewed in FIG. 1, coil 126 has two legs 143 and 145 which extend generally radially of the virtual pivot point defined by flexure hinge 130 and also generally perpendicular to the direction of movement of the armature 116. Likewise, coil 128 has two legs 147 and 149 which extend generally radially of the virtual pivot point defined by the flexure hinge 130. Tabs 136 and 140 are formed on the outer ends of the springs 132 and 134 respectively. Tab 136 is soldered to mounting pad 112, and tab 140 is soldered to pad 110.

An armature 116' is generally similar to armature 116, and parts of armature 116' which are similar to parts in armature 116 have the same reference numeral with a prime added. Tabs 136' and 140' are soldered to mounting pads 108 and 106 respectively. As shown in FIG. 1, a permanent ceramic magnet 148 is arranged to produce the magnetic fields in the vicinity of coils 128 and 128'. A second permanent ceramic magnet 150, similar to magnet 148, produces the magnetic fields in the vicinity of coils 126 and 126'. The magnets 148 and 150 are cemented to the underside of a plate 152 made from mild steel. Plate 152 has an aperture 154 therein for receiving a lens 156. Plate 152 has tabs 158 which receive posts 104, and fasteners 105 hold the actuator 100 together. In the assembled form of actuator 100, a gap is formed between the magnets 148, 150, and the mechanism plate 101, and the armatures 116 and 116' are adapted to move in this gap.

With reference to FIG. 2, the positions of the armatures 116 and 116' are shown in the initial, or rest positions. In FIG. 3, the positions of the armatures 116 and 116' are shown in the fully open positions. In operation, when the positive terminal of an electrical power supply is connected to the terminal adjacent mounting pad 112, and the negative terminal of the power supply is connected to the terminal adjacent mounting pad 106, current flows counterclockwise in coils 128 and 126 and clockwise in coils 128' and 126'. The forces generated, due to the currents flowing in the magnetic fields produced by magnets 148 and 150, cause armature 116 to pivot in a clockwise direction, and armature 116' to pivot in a counterclockwise direction, thereby moving blades 118 and 118' to uncover aperture 102, as shown in FIG. 3. The forces on armatures 116 and 116' can be controlled by controlling the current supplied to the actuator 100.

Figure 6:
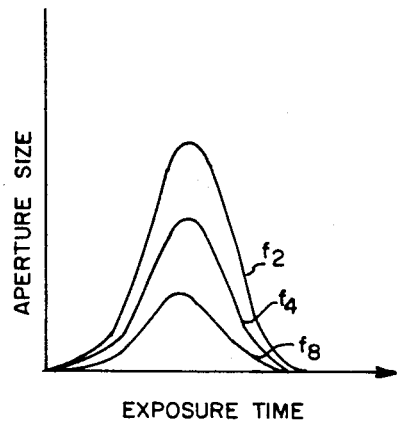
FIG. 6 shows different curves in which aperture size is plotted versus exposure time.

It has been found that the effects of static friction are overcome, and reliable, repeatable position control is achieved by applying the driving current to armatures 116 and 116' in pulses of constant amplitude. The frequency of the pulses in the control signal is chosen to be somewhat above the cutoff frequency, but not so far above the cutoff frequency that the system does not respond, since the armatures 116 and 116' must vibrate enough to break the static friction. The cutoff frequency is the point in a frequency vs. response curve (not shown) of actuator 100 where the response is down about 3 dB from the DC response. In the preferred embodiment of the invention, the pulse duration is modulated to control aperture size, and the number of pulses applied to the actuator controls the shutter time. The amount of light admitted through aperture 102 during an exposure interval depends on the effective aperture size and the time blades 118, 118', remain open. Various exposure apertures plotted against time are shown in FIG. 6 where the area under each curve represents the total quantity of light admitted during an exposure interval. A more complete description of the use of pulses to drive an exposure control actuator is contained in commonly-assigned U.S. Pat. No. 4,333,722, issued June 8, 1982, and this patent is expressly incorporated herein by reference.

As shown in FIG. 4, control means 199 comprises a microprocessor 200, a reference oscillator 202, a light-controlled oscillator 204, a sensing control 230, an output driver 206, a power supply 208 and an actuator switch 210. The light-controlled oscillator 204 functions as a means for providing an output indicative of ambient light and includes a photosensitive element, such as a photodiode 212, a logarithmic feedback diode 214, an operational amplifier 216, and a voltage controlled oscillator 218. These elements are responsive to scene light to produce a voltage proportional to the log of the intensity of the scene light; this voltage is applied to the voltage controlled oscillator 218 to produce a pulse train having a repetition frequency proportional to the log of the intensity of scene light.

When switch 210 is closed by an operator, reference oscillator 202 starts to produce clock pulses used to time the operations of the microprocessor 200, microprocessor 200 is initialized, and the light-controlled oscillator 204 starts to produce a pulse train having a frequency proportional to the log of the scene light. The microprocessor 200 is programmed to sample the output of the light-controlled oscillator 204 and to count the number of pulses received during a predetermined time interval. The final count is proportional to the log of the scene brightness. The microprocessor 200 employs a look up table, using the pulse count as an address, to retrieve the required pulse duration and total number of pulses needed to produce the proper aperture and shutter time. The microprocessor 200 then constructs the pulse train from the information retrieved from the table. The driver 206 buffers the pulse train from the microprocessor and applies the pulse train to the armatures 116 and 116'.

The control means 199 is easily adapted for total program control, including a shutter preferred operation or an aperture preferred operation. If a shutter preferred operation or an aperture preferred operation is employed, in addition to measuring the scene light, the microprocessor retrieves desired aperture or shutter settings from manually set inputs; such inputs are indicated in dotted lines in FIG. 4 by a block 220 for aperture settings and a block 222 for shutter settings. The microprocessor 200 uses the manual inputs to compute, or retrieve from a look-up table, the proper actuator pulse control train. The microprocessor 200 can be programmed to override any manual input that would result in improper exposure.

Figure 5:
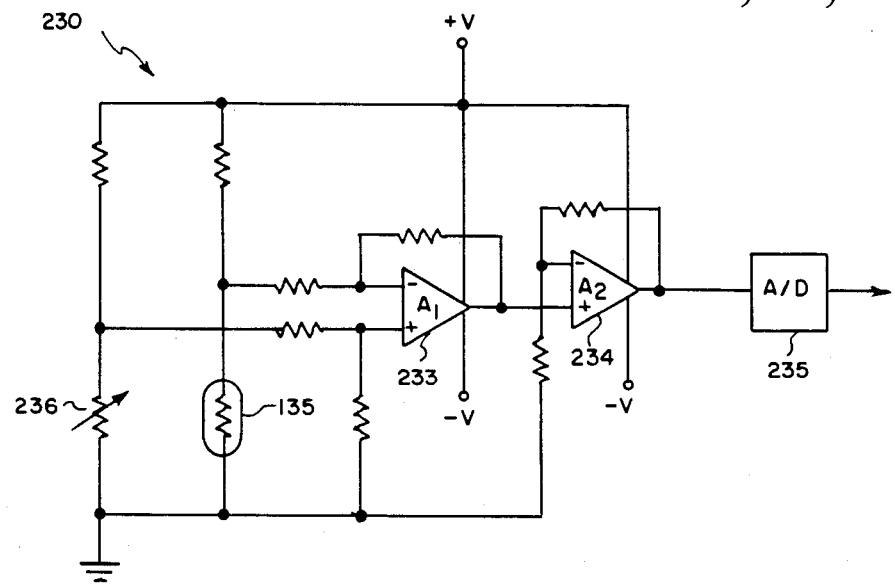
FIG. 5 is a circuit diagram of the sensing control.

In the present invention, microprocessor 200 is adapted to adjust the pulse train applied to armature 116, 116' in accordance with an output from sensing control 230. This output is proportional to a change in spring 132, and it is indicative of the position of blade 118. As shown in FIG. 5, transducer 135 is connected in a conventional amplifier circuit having a differential amplifier 233 and a buffer amplifier 234. The output of buffer amplifier 234 is connected to a suitable analog-to-digital converter 235 which provides an output to microprocessor 200. A calibration resistor 236 is provided to adjust the offset so that the signal from control 230 is zero when the armatures 116 and 116' are in the position shown in FIG. 2.

The displacement of the aperture blade 118, attached to leaf spring 132, produces a change in the resistance of transducer 135 which results in an analog signal at the output of amplifier 234 that is representative of the displacement of blade 118. The signal from amplifier 234 is processed by the analog-to-digital converter 235 which supplies a digital signal to the microprocessor 200. The microprocessor 200 is programmable to control the timing and the amplitude of the pulses supplied to armatures 116 and 116' to produce a desired exposure in accordance with the signal from control 230. Thus, the signal from control 230 is compared by microprocessor 200 with values representative of the desired positions of blade 118 for a particular scene brightness. If such a comparison indicates that blade 118 is not moving as desired, the pulse train will be corrected to obtain the proper exposure.

It will be apparent that the present invention would be used to reflect the adjustment of an exposure setting mechanism, such as the aperture adjustment ring (not shown) common on cameras used with 35 mm film. In such an arrangement, the aperture blades 118 and 118' would define a selected aperture, and a separate shutter blade (not shown) could be actuated to initiate and terminate the exposure at a predetermined time.

The present invention is also useful with a camera having a fixed aperture. In this case, the signal produced by a strain transducer would be used to monitor the movement of a shutter blade (not shown) to produce a desired exposure time.

The disclosed invention provides a simple, reliable means of continuously monitoring the position of an aperture blade during an exposure interval. It will be apparent that a pair of strain transducers could be connected as complementary elements in a bridge circuit to provide temperature compensation for the transducers, as is well known in the transducer art.

The invention has been described in detail with particular reference to a preferred embodiment thereof, but it will be understood that variations and modifications can be effected within the spirit and scope of the invention.

I claim:

1. Exposure control apparatus for regulating the amount of light admitted to a selected area, said apparatus comprising:
   light limiting means movable from a rest position to admit light to said area;
   means for moving said light limiting means;
   means for urging said light limiting means toward said rest position;
   means for providing a first output indicative of ambient light;
   means for sensing a change in said urging means which is indicative of an instantaneous position of said light limiting means and for producing a second output proportional to said change; and
   means for actuating said moving means to admit a predetermined amount of light to said area in response to said first and second outputs.

2. Exposure control apparatus, as defined in claim 1, wherein said light limiting means includes a pivotally mounted aperture blade 3. Exposure control apparatus, as defined in claim 1, wherein said means for moving said light limiting means includes electromagnetic means.

4. Exposure control apparatus, as defined in claim 1, wherein said urging means includes spring means connected to said light limiting means.

5. Exposure control apparatus, as defined in claim 1, wherein said sensing means comprises a strain transducer mounted on said urging means.

6. Exposure control apparatus for use in regulating the amount of light admitted to a photosensitive surface, said apparatus comprising an aperture blade movable from a rest position to admit light to said surface, means for moving said aperture blade, means for sensing the position of said blade at selected positions and for providing signals indicative of said positions, means for actuating said moving means in response to said signals and to an input indicative of exposure conditions characterized in that said sensing means includes means for continuously sensing the position of said aperture blade and for providing a signal indicative of the instantaneous position of the blade, means is provided for urging said aperture blade toward said rest position, and said sensing means senses a change in said urging means which is proportional to a change in the position of said blade.

7. Exposure control apparatus comprising:
   an element movable from an initial position to define apertures of a plurality of sizes;
   means for urging said element toward said initial position;
   a strain transducer operatively connected to said urging means for sensing a change in the urging means upon movement of said element and for providing a signal indicative of the instantaneous size of aperture defined by the element; and
   means for controlling the instantaneous movement of said element in accordance with said signal.

* * * * *